US012706339B2

(12) United States Patent
Imabori et al.

(10) Patent No.: US 12,706,339 B2
(45) Date of Patent: Aug. 11, 2026

(54) MANUFACTURING METHOD FOR SECONDARY BATTERY AND SECONDARY BATTERY

(71) Applicant: PRIME PLANET ENERGY & SOLUTIONS, INC., Tokyo (JP)

(72) Inventors: Toshiki Imabori, Kasai (JP); Yohei Muroya, Kakogawa (JP); Kohji Umemura, Ono (JP); Koshiro Yoneda, Ichinomiya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 674 days.

(21) Appl. No.: 17/932,055

(22) Filed: Sep. 14, 2022

(65) Prior Publication Data

US 2023/0124030 A1 Apr. 20, 2023

(30) Foreign Application Priority Data

Sep. 27, 2021 (JP) ................................ 2021-156664

(51) Int. Cl.

| | |
|---|---|
| ***H01M 50/188*** | (2021.01) |
| ***H01M 10/04*** | (2006.01) |
| ***H01M 50/50*** | (2021.01) |
| ***H01M 50/543*** | (2021.01) |

(52) U.S. Cl.

CPC ......... *H01M 50/188* (2021.01); *H01M 10/04* (2013.01); *H01M 50/543* (2021.01)

(58) Field of Classification Search

CPC ... H01M 50/188; H01M 50/543; H01M 10/04

See application file for complete search history.

(56) References Cited

U.S. PATENT DOCUMENTS

| | | | | |
|---|---|---|---|---|
| 5,586,993 | A | 12/1996 | Saito et al. | |
| 2005/0095502 | A1* | 5/2005 | Sugimune ........... | H01M 50/176 429/180 |
| 2013/0323574 | A1 | 12/2013 | Tsunaki et al. | |
| 2016/0372722 | A1 | 12/2016 | Yoshida et al. | |

(Continued)

FOREIGN PATENT DOCUMENTS

| | | | |
|---|---|---|---|
| CN | 106257711 | A | 12/2016 |
| CN | 110034250 | A | 7/2019 |
| JP | 2008-270167 | A | 11/2008 |

(Continued)

*Primary Examiner* — Kenneth J Douyette

(74) *Attorney, Agent, or Firm* — Finnegan, Henderson, Farabow, Garrett, and Dunner, LLP

(57) ABSTRACT

A manufacturing method for the secondary battery includes a first preparation step for inserting a terminal formed in an oval like shape and having a cylindrical shaft part into an attachment hole formed on a sealing plate of the secondary battery, a second preparation step for arranging a conductive member on a surface at a side where the shaft part of the sealing plate protrudes, a first caulking step for using a caulking tool that includes a tip end part formed in an oval like shape and includes a base end part formed in a complete round shape whose diameter is larger than the tip end part, to insert the tip end part into the shaft part, so as to make the base end part expand an inner diameter of the shaft part, and a second caulking step for pressing an expanded portion of the shaft part to be flat.

3 Claims, 8 Drawing Sheets

(56) References Cited

U.S. PATENT DOCUMENTS

| | | | |
|---|---|---|---|
| 2018/0062123 | A1 | 3/2018 | Ikeda et al. |
| 2019/0189995 | A1 | 6/2019 | Nemoto et al. |

FOREIGN PATENT DOCUMENTS

| | | | |
|---|---|---|---|
| JP | 2009-259524 | A | 11/2009 |
| JP | 2013-246966 | A | 12/2013 |
| JP | 2017-010743 | A | 1/2017 |
| JP | 2019-036412 | A | 3/2019 |
| JP | 6577998 | B2 | 9/2019 |
| JP | 2019-200859 | A | 11/2019 |
| JP | 2021-057234 | A | 4/2021 |
| KR | 10-0210271 | B1 | 1/1996 |

* cited by examiner

MANUFACTURING METHOD FOR SECONDARY BATTERY AND SECONDARY BATTERY

CROSS REFERENCE TO RELATED APPLICATIONS

The present application claims the priority based on Japanese Patent Application No. 2021-156664 filed on Sep. 27, 2021, the entire contents of which are incorporated in the present specification by reference.

The present disclosure relates to a manufacturing method for a secondary battery, and to the secondary battery.

BACKGROUND

For example, Japanese Patent Application Publication No. 2008-270167 discloses a sealed type battery that includes an electrode outside terminal, a sealing plate, and an electrical collector plate overlaid on the sealing plate. The electrode outside terminal includes a flange part and a columnar inserting part that protrudes in one direction from the flange part. A shape of a traverse cross section of the columnar inserting part is a hollow truck shape. On each of the sealing plate and the electrical collector plate, a penetration hole is formed into which the columnar inserting part is inserted. Here, to overlap the penetration hole of the sealing plate and the penetration hole of the electrical collector plate, the sealing plate and the electrical collector plate are overlaid, and the columnar inserting part is inserted into these penetration holes. Then, by caulking a tip end portion of the columnar inserting part, it is possible to fix the electrode outside terminal to the sealing plate.

For example, Japanese Patent Application Patent No. 6577998 discloses a square secondary battery that includes an outside terminal, a cover, and an electrical collector plate overlaid on the cover. The outside terminal includes a terminal head part formed in a rectangular shape and includes a shaft part provided on a terminal head part and formed in an oval shape. On the cover, a penetration hole is formed into which a shaft part of the outside terminal is inserted. On the electrical collector plate, an opening hole is formed into which the shaft part is inserted. Here, to overlap the penetration hole and the opening hole, the cover and the electrical collector plate are overlaid. Then, the shaft part of the outside terminal is inserted into the penetration hole and the opening hole. Then, by caulking a tip end portion of the shaft part, it is possible to fix the outside terminal to the cover.

Anyway, on the electrode outside terminal disclosed by Japanese Patent Application Publication No. 2008-270167, the columnar inserting part formed in the truck shape is caulked. On the outside terminal disclosed by Japanese Patent Application Patent No. 6577998, the shaft part formed in the oval shape is caulked. As described above, if a member formed in the truck shape or the oval shape is caulked, a thickness of the caulked portion had been far from constant and had been varied. As the result, it happened that a caulking strength had not been secured.

SUMMARY

A manufacturing method for a secondary battery proposed here includes a first preparation step, a second preparation step, a first caulking step, and a second caulking step. At the first preparation step, a terminal formed in an oval like shape and having a cylindrical shaft part is inserted into an attachment hole formed on a sealing plate of a secondary battery that includes a case main body whose part is opened and includes the sealing plate provided at the opening of the case main body, so as to make the shaft part protrude from the sealing plate. At the second preparation step, a conductive member is arranged at a periphery of the attachment hole and on a surface at a side where the shaft part of the sealing plate protrudes. At the first caulking step, a caulking tool having a tip end part formed in an oval like shape and having a base end part formed in a complete round shape whose diameter is larger than the tip end part is used to insert the tip end part into the shaft part of the terminal, so as to make the base end part expand an inner diameter of a portion of the shaft part protruding from the sealing plate. At the second caulking step, the portion of the shaft part expanded at the first caulking step is pressed to be flat.

According to the manufacturing method for the secondary battery proposed here, it is possible by the tip end part formed in the oval like shape of the caulking tool to uniformly abut the inner circumferential surface of the shaft part formed in the oval like shape. Then, the base end part formed in the complete round shape of the caulking tool is abutted on the shaft part, to outwardly widen from a portion of the shaft part along the long diameter direction of the oval like shape, and thus it is possible to inhibit variation in the thicknesses of the caulked portion of the shaft part. Therefore, it is possible to secure the caulking strength for the terminal.

According to the manufacturing method for the secondary battery proposed here, the base end part might include a reduced diameter portion whose diameter becomes smaller toward the tip end part. At the first caulking step, the reduced diameter portion of the base end part might be used to expand the inner diameter of the portion of the shaft part protruding from the sealing plate.

The manufacturing method for the secondary battery proposed here might include a third caulking step for pressing to form a step on a peripheral edge part in a long diameter direction of the oval like shape of the expanded portion of the shaft part pressed to be flat at the second caulking step.

The secondary battery proposed here includes a case main body whose part is opened, a sealing plate that is provided at the opening of the case main body, a terminal that is attached to the sealing plate, and a conductive member that is connected to the terminal. The terminal includes a caulked part that is caulked with respect to the conductive member and is formed in an oval like shape. The caulked part includes a long diameter part that is along a long diameter direction of the oval like shape, and a short diameter part that is along a short diameter direction of the oval like shape. A length of the long diameter part in the short diameter direction is longer than a length of the short diameter part in the long diameter direction.

In the secondary battery proposed here, a rate of a thickness of the long diameter part with respect to a thickness of the short diameter part might be 0.9 to 1.1.

DETAILED DESCRIPTION

Below, one embodiment of a herein disclosed secondary battery will be explained with drawings. The matters other than matters particularly mentioned in this specification, and required for practicing the present invention can be grasped as design matters of those skilled in the art based on the related art in the present field. The present disclosure can be implemented on the basis of contents disclosed in the present specification and a common general technical knowledge of this field. Incidentally, in the following accompanying drawings, the members/parts providing the same effect are given the same numerals and signs.

In the present specification, the "battery" is a term denoting an electric storage device capable of extracting the electric energy in general, and is a concept including a primary battery and a secondary battery. The term "secondary battery" means an electric storage device in general that can be repeatedly charged and discharged, and semantically covers a so-called storage battery, such as a lithium secondary battery, a nickel hydrogen battery, and a nickel cadmium battery. Below, a lithium ion secondary battery, which is one kind of the secondary battery, is taken as an example, and then the herein disclosed secondary battery will be described in details. However, the herein disclosed secondary battery is not restricted to the lithium ion secondary battery in accordance with the embodiment explained here.

Figure 1:
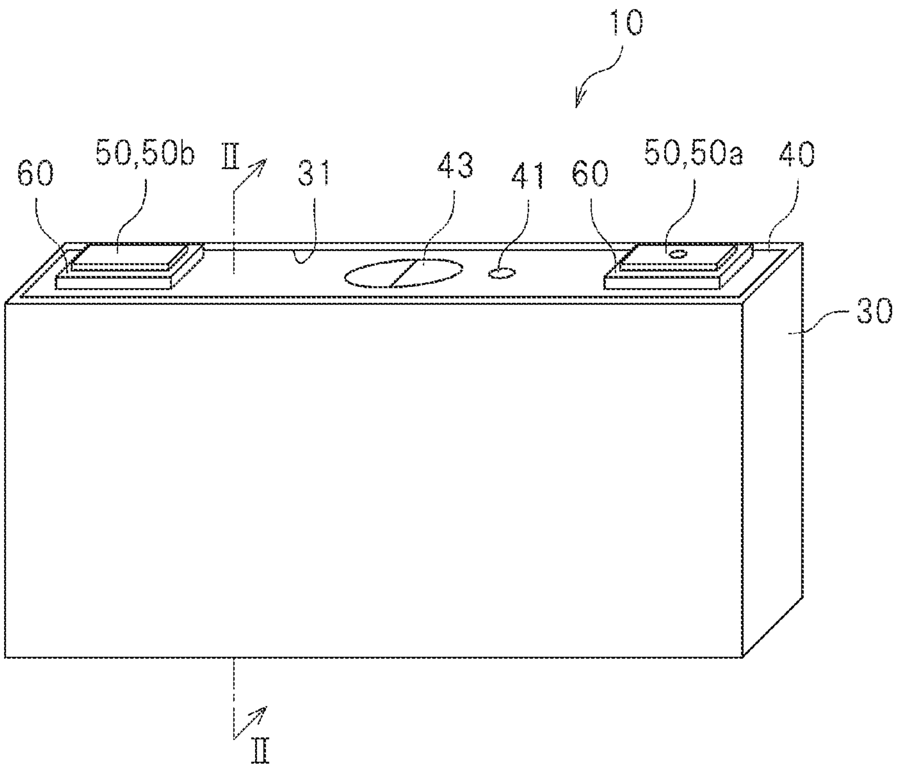
FIG. 1 is a perspective view that schematically shows a secondary battery in accordance with an embodiment.
Figure 2:
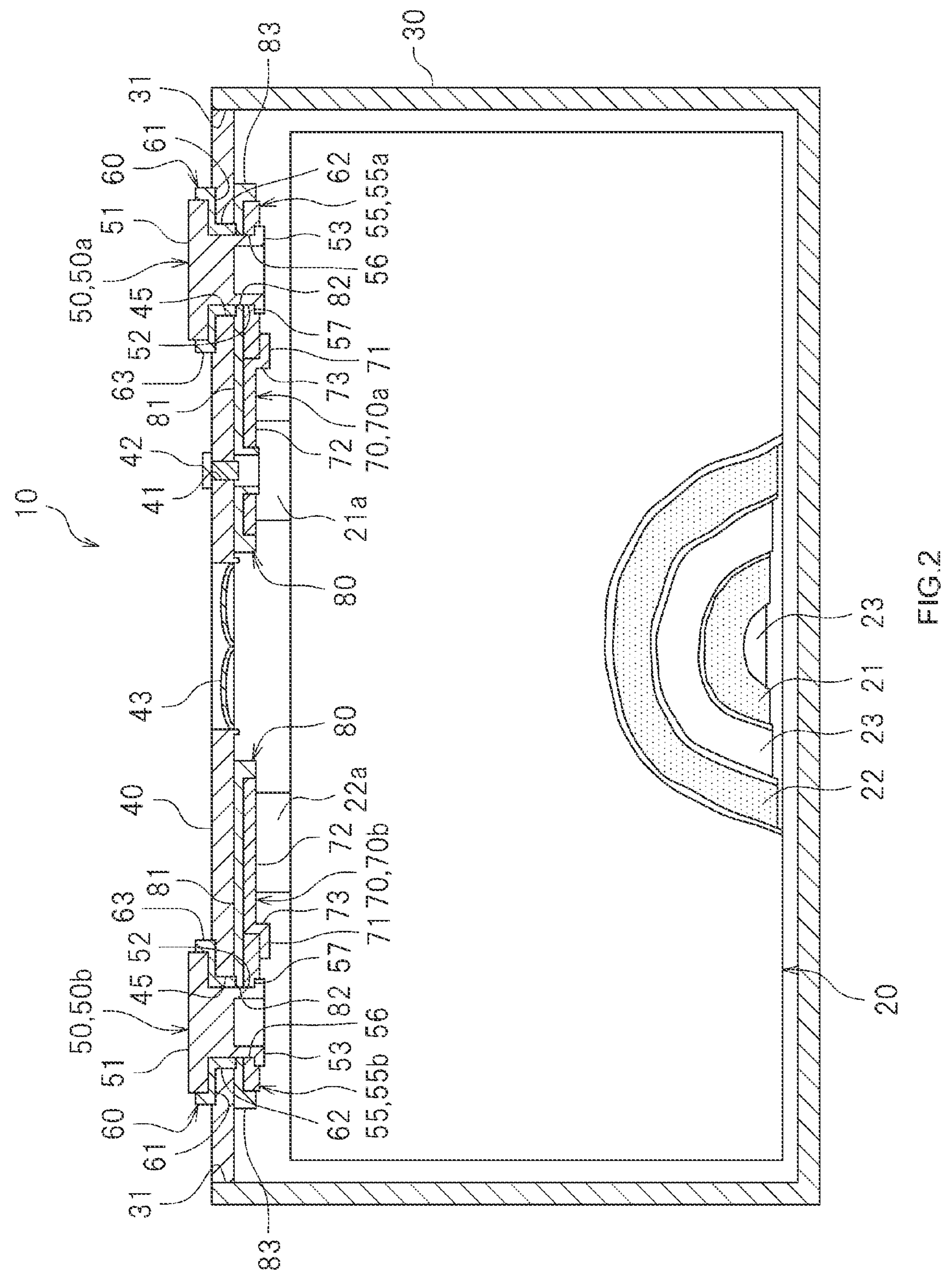
FIG. 2 is a cross sectional view of the secondary battery at a II-II cross section of FIG. 1, and a view that is schematically shown.

FIG. 1 is a perspective view of a secondary battery 10 in accordance with the present embodiment. FIG. 2 is a cross sectional view of the secondary battery 10 at a II-II cross section of FIG. 1. As shown in FIG. 1 and FIG. 2, the secondary battery 10 includes an electrode body 20, a case main body 30, and a sealing plate 40.

As shown in FIG. 2, the electrode body 20 is a power generating element of the secondary battery 10. The electrode body 20 includes a positive electrode sheet 21 as a positive electrode element, a negative electrode sheet 22 as a negative electrode element, and a sheet-shaped separator 23. The separator 23 is arranged between the positive electrode sheet 21 and the negative electrode sheet 22. In the electrode body 20, the positive electrode sheet 21, the negative electrode sheet 22, and the separator 23 are laminated. The electrode body 20 in accordance with the present embodiment has a laminate type structure in which the positive electrode sheet 21 and the negative electrode sheet 22, formed into predetermined shapes, are overlaid via the separator 23.

The positive electrode sheet 21 includes, for example, a positive electrode collector foil that is formed in a rectangular shape, a positive electrode active material layer that is formed on both surfaces of the positive electrode collector foil, and a positive electrode collector tab 21*a* that protrudes from the positive electrode active material layer. The positive electrode collector foil is, for example, an aluminum foil. The positive electrode active material layer contains a positive electrode active substance. The positive electrode active substance, for example, in a lithium ion secondary battery, is a material like a lithium transition metal composite material that can release lithium ions at an electrically charging time and can absorb lithium ions at an electrically discharging time. However, in general, various materials other than the lithium transition metal composite material are proposed as the positive electrode active substance, and thus the positive electrode active substance is not particularly restricted. The positive electrode collector tab 21*a* is a part of the positive electrode collector foil and protrudes from the positive electrode active material layer. Here, the positive electrode collector tab 21*a* protrudes upward from the positive electrode active material layer. On the positive electrode collector tab 21*a*, the positive electrode active material layer is not formed.

The negative electrode sheet 22 includes, for example, a negative electrode collector foil that is formed in a rectangular shape, a negative electrode active material layer that is formed on both surfaces of the negative electrode collector foil, and a negative electrode collector tab 22*a* that protrudes from the negative electrode active material layer. The negative electrode collector foil is, for example, a copper foil. The negative electrode active material layer contains a negative electrode active substance. The negative electrode active substance, for example, in a lithium ion secondary battery, is a material like a natural graphite that can store lithium ions at an electrically charging time and can release lithium ions, stored at the electrically charging time, at an electrically discharging time. However, in general, various materials other than the natural graphite are proposed as the negative electrode active substance, and thus the negative electrode active substance is not particularly restricted. The negative electrode collector tab 22*a* is a part of the negative electrode collector foil and protrudes from the negative electrode active material layer. Here, the negative electrode collector tab 22*a* protrudes upward from the negative electrode active material layer. On the negative electrode collector tab 22*a*, the negative electrode active material layer is not formed.

The separator 23 is, for example, formed with a porous sheet (e.g., a film, a non-woven fabric, or the like) consisted of a resin, such as polyethylene (PE), polypropylene (PP), polyester, cellulose, and polyamide.

In the present embodiment, the electrode body 20 is manufactured, in a state where a plurality of positive electrode collector tabs 21*a* are overlaid and a plurality of negative electrode collector tabs 22*a* are overlaid, by laminating the positive electrode sheet 21 and the negative electrode sheet 22 via the separator 23.

As shown in FIG. 2, the case main body 30 is a case including a space at the inside and a part of the case is opened. Here, the case main body 30 accommodates the electrode body 20 and, on the case main body 30, an opening 31 is formed to accommodate the electrode body 20. As shown in FIG. 1, the case main body 30 is formed in a rectangular shape, but the shape of the case main body 30 is not particularly restricted. The case main body 30 is formed, for example, with aluminum or with aluminum alloy whose main component is aluminum, but even a material for forming the case main body 30 is not particularly restricted.

In the present embodiment, the case main body 30 might accommodate an electrolyte in addition to the electrode body 20. As the electrolyte, it is possible to use a nonaqueous electrolyte in which a supporting salt is dissolved into a nonaqueous type solvent. As an example of the nonaqueous type solvent, it is possible to use carbonate type solvent, such as ethylene carbonate, dimethyl carbonate, and ethyl methyl carbonate. As an example of the supporting salt, it is possible to use a fluorine-containing lithium salt, such as $LiPF_6$.

The sealing plate 40 is a plate-shaped member provided on the opening 31 of the case main body 30. The sealing plate 40 is formed in a rectangular shape (here, oblong rectangle shape) longer in a predetermined direction. Here, in a state where the sealing plate 40 is attached to the opening 31, a peripheral edge part of the sealing plate 40 is joined to a rim of the opening 31 of the case main body 30. It is preferable that this join is implemented, for example, by welding continuously without gaps and, for example, it is implemented by laser welding. The sealing plate 40 is formed, for example, with aluminum or with aluminum alloy whose main component is aluminum, but even a material for forming the sealing plate 40 is not particularly restricted.

In the present embodiment, as shown in FIG. 1, an injection hole 41 and a gas exhaust valve 43 is provided on the sealing plate 40. The injection hole 41 is a hole for injecting the electrolyte into the case main body 30 after the sealing plate 40 is attached to the case main body 30. As shown in FIG. 2, it is possible to fit a plug 42 into the injection hole 41. By fitting the plug 42 into the injection hole 41, the injection hole 41 is closed. The gas exhaust valve 43 is a thin-walled part that is configured to be broken so as to exhaust gas inside the case main body 30 to the outside of the case main body 30 when an internal pressure of the secondary battery 10 becomes equal to or more than a predetermined value.

The secondary battery 10 in accordance with the present embodiment includes a terminal 50, a conductive member 55, and a connecting member 70. The terminal 50 is attached to the sealing plate 40. Here, the terminal 50 includes a positive electrode terminal 50*a* that is connected to the positive electrode sheet 21 of the electrode body 20, and includes a negative electrode terminal 50*b* that is connected to the negative electrode sheet 22 of the electrode body 20. Here, the positive electrode terminal 50*a* and the negative electrode terminal 50*b* have the same shape and the same configuration. Below, in explanations common for the positive electrode terminal 50*a* and the negative electrode terminal 50*b*, a wording of terminal 50 would be used.

Figure 3:
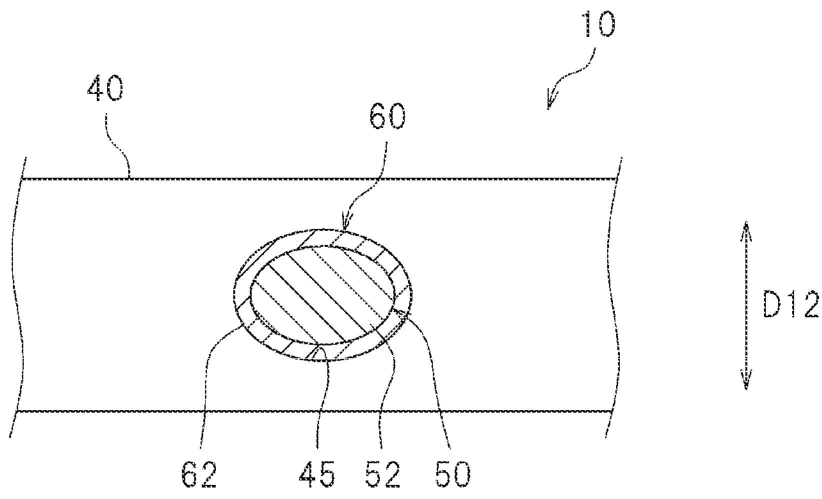
FIG. 3 is a plane view that schematically shows an attachment hole of a sealing plate.

FIG. 3 is a plane view in which an attachment hole 45 of the sealing plate 40 is schematically shown. FIG. 3 shows a state in which the terminal 50 cut by a traverse cross section is inserted into the attachment hole 45. In the present specification, the traverse cross section means a cross section cut in a horizontal direction. In the present embodiment, as shown in FIG. 3, the attachment hole 45 is formed on the sealing plate 40. The attachment hole 45 is formed in an oval like shape. Here, the oval means a curve geometrically similar to an egg shape, an ellipse shape, an oval shape. The oval like shape semantically contains an oval shape, a truck shape, an ellipse shape, an egg shape, and the like. In the present embodiment, a long diameter direction D11 of the oval like shape is the same as a longitudinal direction of the sealing plate 40. A short diameter direction D12 of the oval like shape is the same as a shorter direction of the sealing plate 40.

In the present embodiment, as shown in FIG. 2, the terminal 50 is attached to the sealing plate 40 in a state of being inserted into the attachment hole 45. Here, as shown in FIG. 3, an outside insulating member 60 exists between a rim of the attachment hole 45 and the terminal 50.

Figure 4:
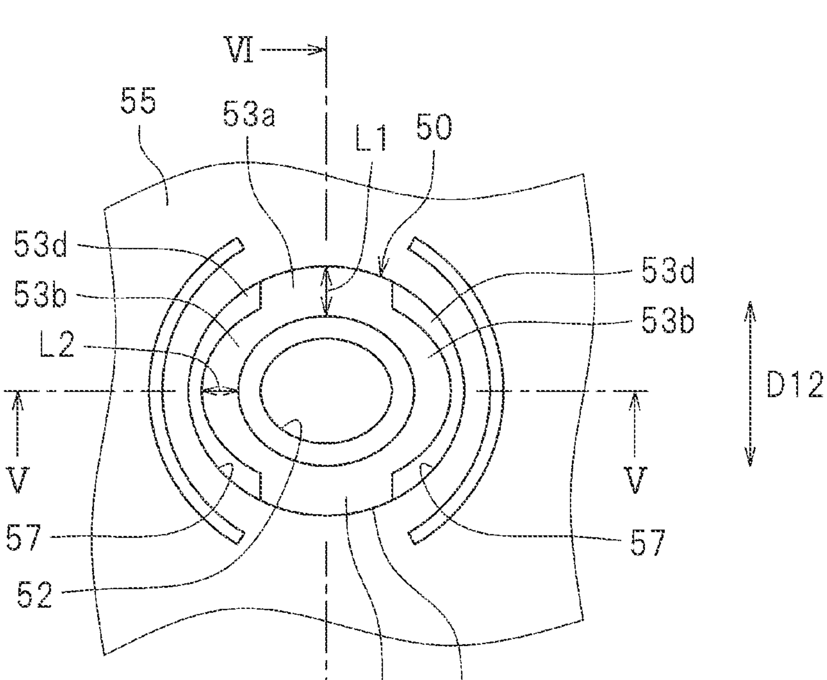
FIG. 4 is a view that schematically shows a caulked part of a terminal.
Figure 5:
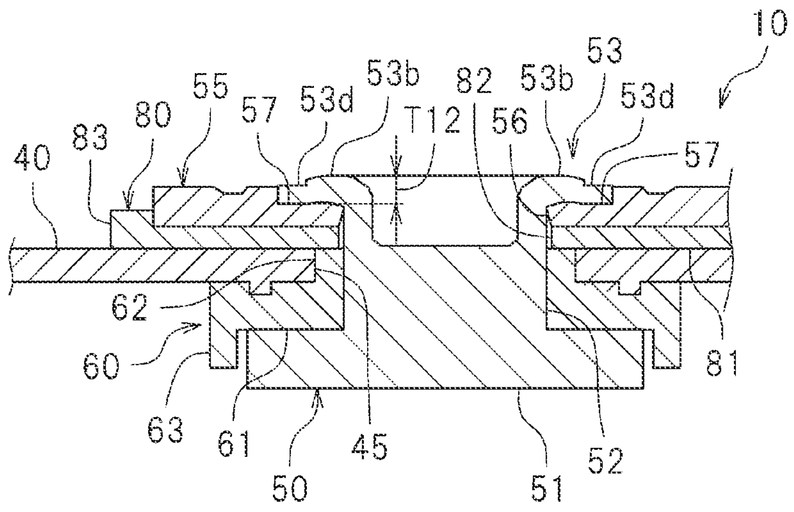
FIG. 5 is a cross sectional view of the terminal at a V-V cross section of FIG. 4, and a view that is schematically shown.
Figure 6:
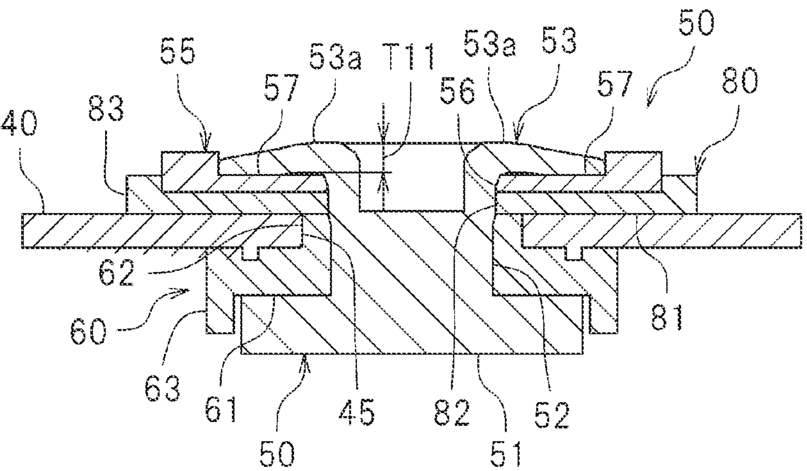
FIG. 6 is a cross sectional view of the terminal at a VI-VI cross section of FIG. 4, and a view that is schematically shown.

FIG. 4 is a view that schematically shows a caulked part 53 of the terminal 50. FIG. 5 is a cross sectional view of the terminal 50 at a V-V cross section of FIG. 4. FIG. 6 is a cross sectional view of the terminal 50 at a VI-VI cross section of FIG. 4. In FIG. 5 and FIG. 6, the upper and lower positions of FIG. 2 are reversed. In the present embodiment, as shown in FIG. 5, the terminal 50 includes a head part 51, a cylinder part 52, and the caulked part 53. The head part 51 is a portion arranged at the outside of the sealing plate 40 (here, a side opposite to the case main body 30). The head part 51 is an approximately flat-plate shaped portion larger than the attachment hole 45, and is arranged along an outside surface of the sealing plate 40.

The cylinder part 52 is a portion that is inserted into the attachment hole 45 via the outside insulating member 60. The cylinder part 52 protrudes downward from a central part of the head part 51. The cylinder part 52 is, for example, a cylindrical portion that extends in an up and down direction. The caulked part 53 is a portion caulked with respect to the conductive member 55 of the terminal 50. In other words, it can be said that the caulked part 53 is a portion caulked with respect to the sealing plate 40. The caulked part 53 is provided at a lower end of the cylinder part 52 and protrudes to an outward of the cylinder part 52. In the present embodiment, the cylinder part 52 and the caulked part 53 each is formed in a shape corresponding to the attachment hole 45, and is formed here in an oval like shape as shown in FIG. 3 and FIG. 4. In other words, the traverse cross section shapes of the cylinder part 52 and the caulked part 53 are oval like shapes. Here, an inner circumferential surface and an outer circumferential surface of the cylinder part 52 are formed in oval like shapes.

As shown in FIG. 5 and FIG. 6, the outside insulating member 60 is attached over an region from an inner circumferential surface of the attachment hole 45 of the sealing plate 40 to a surface at the outside of the sealing plate 40 (in other words, a head part 51 side of the terminal 50). In the present embodiment, the outside insulating member 60 includes a base part 61, an insulation cylinder part 62, and a side wall 63. The base part 61 is a plate-shaped member that is attached to a portion of a surface at the outside of the sealing plate 40 around the attachment hole 45. On the base part 61, the head part 51 of the terminal 50 is arranged. The insulation cylinder part 62 is a cylindrical portion that protrudes from a bottom surface of the base part 61. The insulation cylinder part 62 is a portion that is inserted into the attachment hole 45. Into the insulation cylinder part 62, the cylinder part 52 of the terminal 50 is inserted. The side wall 63 is standing from a peripheral edge of the base part 61. The head part 51 of the terminal 50 is surrounded by the side wall 63 of the outside insulating member 60.

The outside insulating member 60 is arranged between the sealing plate 40 and the terminal 50, and secures insulation of them. In addition, the outside insulating member 60 secures the airtightness of the attachment hole 45 of the sealing plate 40. In consideration of the perspective described above, it is preferable that the outside insulating member 60 consists of a material outstanding for a chemical resistant property or a weather resistant property. In this embodiment, PFA is used for the outside insulating member 60. PFA is a copolymer with tetrafluoroethylene and perfluoroalkoxyethylene (Tetrafluoroethylene-Perfluoroalkylvinylether Copolymer). However, the material used for the outside insulating member 60 is not restricted to PFA.

As shown in FIG. 2, the conductive member 55 is connected to the terminal 50. Here, the conductive member 55 connected to the positive electrode terminal 50*a* is referred to as a positive electrode conductive member 55*a*, too. The conductive member 55 connected to the negative electrode terminal 50*b* is referred to as a negative electrode conductive member 55*b*, too. The conductive member 55 is arranged inside the case main body 30. The conductive member 55 is arranged along a surface at an inner side of the sealing plate 40, and is provided at a periphery of the attachment hole 45. The conductive member 55 is a plate-shaped member. As shown in FIG. 5, the conductive member 55 includes a penetration hole 56 and a groove 57. The penetration hole 56 penetrates the conductive member 55. Into the penetration hole 56, the cylinder part 52 of the terminal 50 is inserted. The penetration hole 56 corresponds to a shape of the cylinder part 52, and is here formed in an oval like shape. The groove 57 is formed at a portion of the conductive member 55 around the penetration hole 56. The groove 57 is a groove dented upwardly from a bottom surface of the conductive member 55. On the groove 57, the caulked part 53 of the terminal 50 is arranged.

As shown in FIG. 2, the connecting member 70 is connected to the conductive member 55. The connecting member 70 is arranged at the inside of the case main body 30, and is arranged along an inner side surface of the sealing plate 40. Here, the connecting member 70 connected to the positive electrode conductive member 55*a* is referred to as a positive electrode connecting member 70*a*, too. The connecting member 70 connected to the negative electrode conductive member 55*b* is referred to as a negative electrode connecting member 70*b*, too. The positive electrode connecting member 70*a* is to connect the positive electrode terminal 50*a* and the positive electrode sheet 21, and is connected to the positive electrode conductive member 55*a* and the positive electrode collector tab 21*a*. The negative electrode connecting member 70*b* is to connect the negative electrode terminal 50*b* and the negative electrode sheet 22, and is connected to the negative electrode conductive member 55*b* and the negative electrode collector tab 22*a*.

In the present embodiment, the connecting member 70 includes a first plate part 71, a second plate part 72, and a step part 73. The first plate part 71 is a portion arranged along a surface of the conductive member 55, and is connected to the conductive member 55. The first plate part 71 is a flat-plate shaped portion. The second plate part 72 is a portion arranged along a surface at an inner side of the sealing plate 40. The second plate part 72 is a flat-plate shaped portion. The second plate part 72 of the positive electrode connecting member 70*a* is joined to the positive electrode collector tab 21*a*. The second plate part 72 of the negative electrode connecting member 70*b* is joined to the negative electrode collector tab 22*a*. The step part 73 is a portion standing from one end part of the first plate part 71 to one end part of the second plate part 72 and coupling the first plate part 71 and the second plate part 72. In the present embodiment, the step part 73 is arranged along an end of the conductive member 55.

In the present embodiment, inside insulating members 80 are provided between the conductive member 55 and the sealing plate 40, and between the connecting member 70 and the sealing plate 40. The conductive member 55 and the connecting member 70 are attached to the sealing plate 40 via the inside insulating member 80.

The inside insulating member 80 includes a flat part 81, a hole 82, and a side wall 83. The flat part 81 is a portion arranged along a surface at an inner side of the sealing plate 40. The flat part 81 is a flat-plate shaped portion. The hole 82 is a hole provided correspondingly to the attachment hole 45 of the sealing plate 40, into which the cylinder part 52 of the terminal 50 is inserted. In the present embodiment, the hole 82 is formed on the flat part 81 and penetrates the flat part 81. The hole 82 is formed in a shape corresponding to the cylinder part 52, and the hole here is formed in an oval like shape. The side wall 83 is extending downward from a peripheral edge part of the flat part 81. The conductive member 55 and the connecting member 70 are surrounded by the side wall 83.

The inside insulating member 80 is arranged inside the case main body 30, and thus it is preferable that the inside insulating member 80 has a necessary chemical resistant property. In the present embodiment, PPS is used for the inside insulating member 80. PPS is a polyphenylene sulfide resin. Incidentally, a material used for the inside insulating member 80 is not restricted to PPS.

Above, the secondary battery 10 in accordance with the present embodiment has been explained. Next, a manufacturing method for the secondary battery 10 will be described. Here, a method for caulking the terminal 50 and fixing to the sealing plate 40 will be explained according to a flowchart of FIG. 7. In the present embodiment, as shown in FIG. 7, the manufacturing method for the secondary battery 10 includes a first preparation step S11, a second preparation step S12, a first caulking step S13, a second caulking step S14, and a third caulking step S15.

Figure 8A:
FIG. 8A is a cross sectional view that schematically shows the terminal before caulking.
Figure 8A:
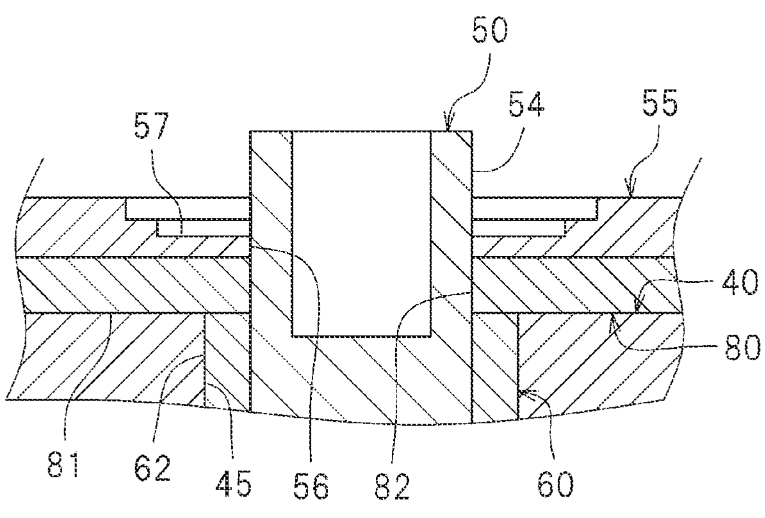
Figure 8B:
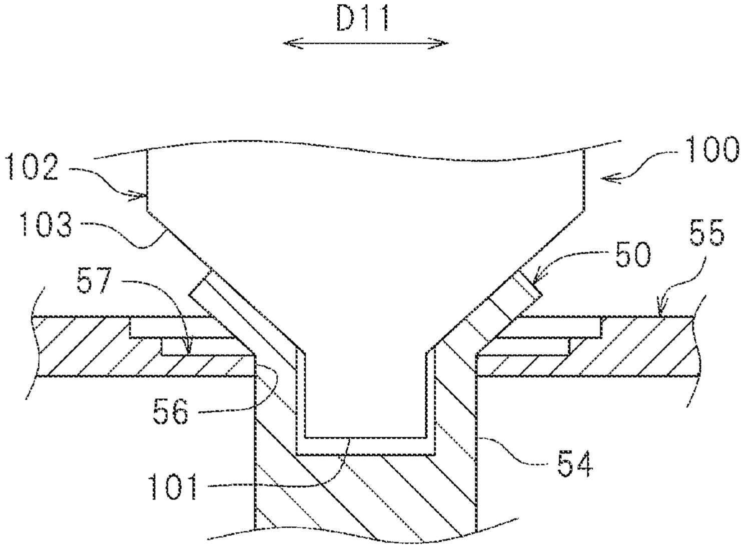
FIG. 8B is a cross sectional view that schematically shows a state of the terminal while a first caulking step is performed.
Figure 8C:
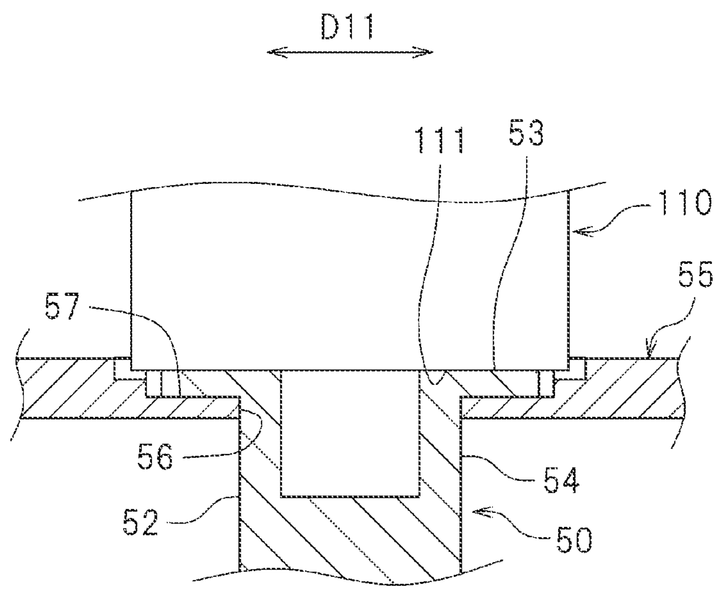
FIG. 8C is a cross sectional view that schematically shows a state of the terminal while a second caulking step is performed.
Figure 8D:
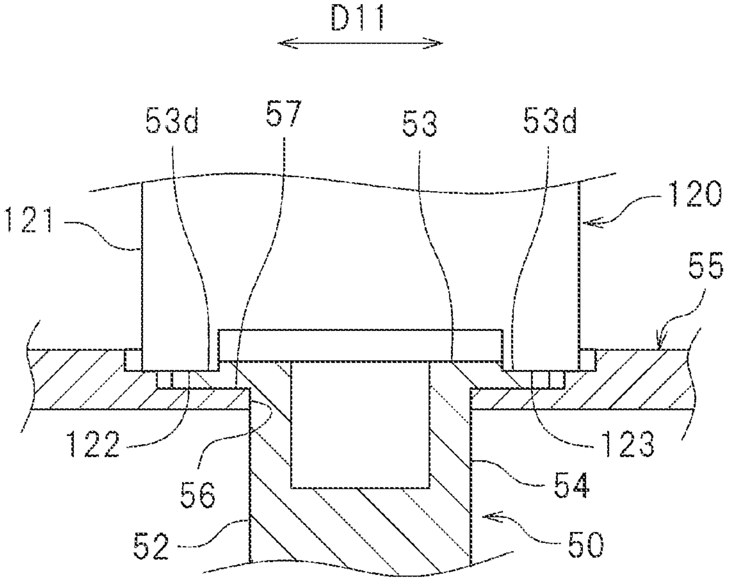
FIG. 8D is a cross sectional view that schematically shows a state of the terminal while a third caulking step is performed.

FIG. 8A is a cross sectional view that shows the terminal 50 before caulking. FIG. 8B, FIG. 8C, and FIG. 8D are cross sectional views respectively showing states of the terminal 50 during the first caulking step S13, the second caulking step S14, and the third caulking step S15. Incidentally, in FIG. 8B to FIG. 8D, drawings of the sealing plate 40, the outside insulating member 60, and the inside insulating member 80 are omitted. In the present embodiment, as shown in FIG. 8A, the terminal 50 includes a shaft part 54. The shaft part 54 is a portion provided at the head part 51 (see FIG. 5).

The shaft part 54 is a portion that can become the cylinder part 52 and the caulked part 53 after the terminal 50 is caulked, as shown in FIG. 8C. Here, by caulking the shaft part 54, it is possible to fix the terminal 50 to the sealing plate 40. In the shaft part 54, a portion being caulked becomes the caulked part 53 and a portion being not caulked becomes the cylinder part 52. In the present embodiment, the shaft part 54 is formed in a cylindrical shape. The shaft part 54 is formed in an oval like shape, and for more details, a shape of a traverse cross section of the shaft part 54 is the oval like shape. A shape of the inner circumferential surface of the shaft part 54 and a shape of the outer circumferential surface of the shaft part each is the oval like shape.

Figure 7:
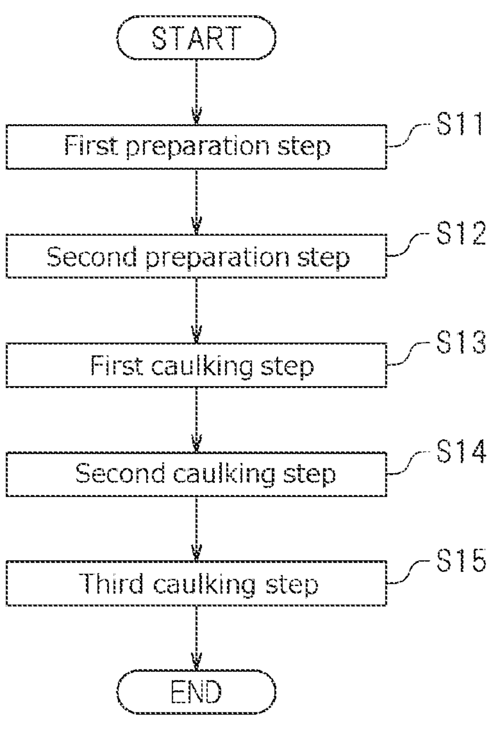
FIG. 7 is a flowchart that shows a method for caulking and fixing the terminal to a sealing plate.

In the present embodiment, at the first preparation step S11 of FIG. 7, as shown in FIG. 8A, the terminal 50 including the shaft part 54 is inserted into the attachment hole 45 formed on the sealing plate 40 to make the shaft part 54 protrude from the sealing plate 40. In the present embodiment, at first, the outside insulating member 60 is inserted into the attachment hole 45 of the sealing plate 40. Here, as shown in FIG. 5, the insulation cylinder part 62 of the outside insulating member 60 is inserted into the attachment hole 45 to make the base part 61 of the outside insulating member 60 be attached to the outside surface of the sealing plate 40. Then, as shown in FIG. 8A, the shaft part 54 of the terminal 50 is inserted into the insulation cylinder part 62 that has been inserted into the attachment hole 45. At that time, as shown in FIG. 5, the head part 51 of the terminal 50 is arranged on the base part 61 of the outside insulating member 60, to induce a state where a part (here, tip end part) of the shaft part 54 (see FIG. 8A) protrudes to an inner side of the sealing plate 40, in other words, to a case main body 30 side.

Next, at the second preparation step S12 of FIG. 7, as shown in FIG. 8A, the conductive member 55 is arranged. Here, the conductive member 55 is arranged on a surface at a side where the shaft part 54 of the sealing plate 40 protrude at the periphery of the attachment hole 45, in other words, on a surface at an inner side of the sealing plate 40. In the present embodiment, at first, the inside insulating member 80 is arranged. Here, the hole 82 is formed on the inside insulating member 80. To overlap this hole 82 with the attachment hole 45 of the sealing plate 40, the inside insulating member 80 is arranged on the surface at the inner side of the sealing plate 40. Then, the conductive member 55 is arranged on the surface at the inner side of the sealing plate 40 via the inside insulating member 80. Here, to make the penetration hole 56 formed on the conductive member 55 be overlapped with the attachment hole 45 of the sealing plate 40 and the hole 82 of the inside insulating member 80, the conductive member 55 is arranged. At that time, the conductive member 55 is arranged on the flat part 81 of the inside insulating member 80.

Incidentally, in the present embodiment, the second preparation step S12 is performed after the first preparation step S11, but the second preparation step S12 might be performed before the first preparation step S11.

Although described above, as shown in FIG. 7, the first caulking step S13 to the third caulking step S15 are performed in an order after the first preparation step S11 and the second preparation step S12 are performed. Here, at first, the first caulking step S13 of FIG. 7 is performed. At the first caulking step S13, as shown in FIG. 8B, an inner diameter of the shaft part 54 of the terminal 50 is expanded. At the first caulking step S13, a first caulking tool 100 is used.

Figure 9:
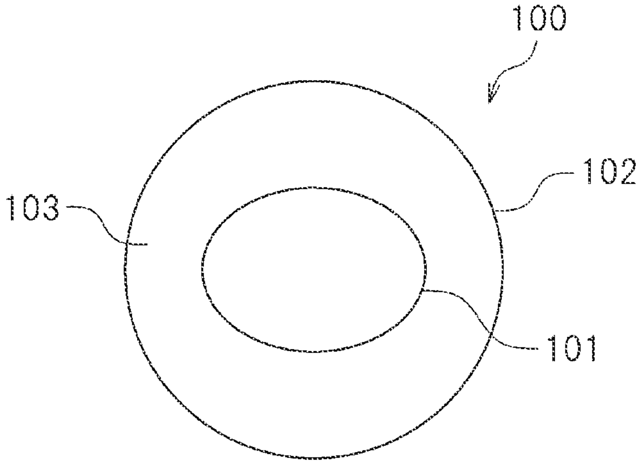
FIG. 9 is a view that schematically shows a first caulking tool and a view that is viewed from a tip end part side.

FIG. 9 is a view showing the first caulking tool 100 and is a view in which the first caulking tool 100 is viewed from a tip end part 101 side. As shown in FIG. 8B and FIG. 9, the first caulking tool 100 includes a tip end part 101 and a base end part 102. As shown in FIG. 8B, the tip end part 101 is a portion that is inserted into the cylindrical shaft part 54 of the terminal 50. The tip end part 101 has a shape corresponding to the inner circumferential surface of the shaft part 54, and the shape here is an oval like shape as shown in FIG. 9. A shape of a traverse cross section of the tip end part 101 is the oval like shape.

As shown in FIG. 8B, the base end part 102 is connected to the tip end part 101. In other words, the tip end part 101 protrudes from the base end part 102. As shown in FIG. 9, the base end part 102 is formed in a complete round shape whose diameter is larger than the tip end part 101. A shape of a traverse cross section of the base end part 102 is the complete round shape. Here, the phrase "whose diameter is larger than the tip end part 101" means that it is larger than a long diameter of the tip end part 101 formed in the oval like shape. In the present embodiment, as shown in FIG. 8B, the base end part 102 includes a reduced diameter portion 103. The reduced diameter portion 103 is a portion whose diameter is getting smaller toward the tip end part 101. An outer circumferential surface of the reduced diameter portion 103 is an inclined surface that is inclined to a central axis of the base end part 102 more toward the tip end part 101. Here, the reduced diameter portion 103 continues to the tip end part 101.

In the present embodiment, the wording "complete round" semantically contains a case of a strictly complete round and a case where a little error is caused on the diameters. For example, it is possible to determine whether it is a strictly complete round or not, by measuring a complete round degree of the base end part 102. In order to measure the complete round degree, for example, the base end part 102 is cut in a diameter direction into 4 equal sections or 8 equal sections. Then, regarding a distance between opposed two points of equally divided boundary points, for example, a micrometer is used to measure a plurality of such distances. The complete round degree is a numerical value obtained by dividing 2 into a difference between the maximum value and the minimum value among a plurality of distances regarding such two points. In the present embodiment, the complete round semantically contains a case where the complete round degree is 0 to 1 mm, preferably the complete round degree is 0 to 0.1 mm, or more preferably the complete round degree is 0 to 0.01 mm.

At the first caulking step S13 of FIG. 7, as shown in FIG. 8B, the first caulking tool 100 is used to insert the tip end part 101 into the shaft part 54 of the terminal 50, so as to make the base end part 102 expand an inner diameter of a portion of the shaft part 54 protruding from the sealing plate 40. Here, the reduced diameter portion 103 of the base end part 102 is used to expand the inner diameter of the portion of the shaft part 54 protruding from the sealing plate 40. Here, the tip end part 101 of the first caulking tool 100 is formed in an oval like shape, and thus the inner circumferential surface of the shaft part 54 is uniformly widen when the tip end part 101 was inserted into the oval-like-shaped shaft part 54. Then, by the reduced diameter portion 103 of the base end part 102 formed in the complete round shape, it is expanded outwardly in a short diameter direction D12 (see FIG. 3) of the oval like shape from a portion of the shaft part 54 along a long diameter direction D11 (see FIG. 3) of the oval like shape, among the inner circumferential surface of the shaft part 54. In the present embodiment, the outer circumferential surface of the reduced diameter portion 103 is an inclined surface, and the inner diameter of the shaft part 54 is expanded along the outer circumferential surface of the reduced diameter portion 103.

Next, at the second caulking step S14 of FIG. 7, as shown in FIG. 8C, the portion of the shaft part 54 expanded at the first caulking step S13 of FIG. 7 is pressed to be flat. At the second caulking step S14, a second caulking tool 110 different from the first caulking tool 100 is used. The second caulking tool 110 includes a flat surface 111. The flat surface 111 is a surface being flat, and has a shape larger than the caulked part 53 of the terminal 50, for example, has a shape which is one size larger than the attachment hole 45 (see FIG. 8A) formed on the sealing plate 40. The flat surface 111 might be formed in a round shape, or might be formed in a rectangular shape.

At the second caulking step S14, the second caulking tool 110 is used to make the flat surface 111 push the expanded portion of the shaft part 54. Then, the second caulking tool 110 is pushed toward the shaft part 54 side so as to make the flat surface 111 press the expanded portion of the shaft part 54. Incidentally, the number of pressing operations at the second caulking step S14 might be 1, or might be plural. By pressing with the second caulking tool 110, the expanded portion of the shaft part 54 becomes to have a flat surface. This expanded portion will be the caulked part 53 of the terminal 50. The caulked part 53 is formed in an oval like shape.

Next, at the third caulking step S15 of FIG. 7, as shown in FIG. 8D, the expanded portion of the shaft part 54 pressed to be flat at the second caulking step S14 of FIG. 7 (hereinafter, referred to as caulked part 53) is pressed to form a step 53*d*. The step 53*d* is, as shown in FIG. 4, formed at a peripheral edge part of the both sides in the long diameter direction D11 of the oval like shape of the caulked part 53. At the third caulking step S15 in accordance with the present embodiment, as shown in FIG. 8D, a third caulking tool 120 is used. The third caulking tool 120 includes a base end part 121, and a first press part 122 and a second press part 123 that protrude downward from a base end part 121. The first press part 122 and the second press part 123 are arranged in an opposed manner, correspondingly to the peripheral edge parts at the both sides in the long diameter direction D11 of the caulked part 53. Although the illustrations are omitted, a bottom surface of the first press part 122 and a bottom surface of the second press part 123 each is formed in an U shape. Here, to make the U-shaped dented portions be opposed, the first press part 122 and the second press part 123 are arranged.

At the third caulking step S15, the third caulking tool 120 is used to make the first press part 122 and the second press part 123 press the peripheral edge parts at the both sides in the long diameter direction D11 of the caulked part 53. At the peripheral edge parts in the long diameter direction D11 of the caulked part 53, which are pressed by the first press part 122 and the second press part 123, the steps 53*d* dented to the sealing plate 40 (see FIG. 8A) side are formed. The shape of this step 53*d* becomes the same as the shape of the bottom surface of the first press part 122 and as the shape of the bottom surface of the second press part 123, and the shape here is an U shape as shown in FIG. 4. Incidentally, the number of pressing operations performed at the third caulking step S15 might be 1, or might be plural.

As described above, regarding the terminal 50 caulked through the first caulking step S13 to the third caulking step S15, the terminal 50 includes the caulked part 53 being caulked with respect to the conductive member 55 and being formed in an oval like shape, as shown in FIG. 4. The caulked part 53 includes a long diameter part 53*a* being along the long diameter direction D11 of the oval like shape, and a short diameter part 53*b* being along the short diameter direction D12 of the oval like shape. In the present embodiment, there are two long diameter parts 53*a*. Two long diameter parts 53*a* configure the peripheral edge parts at both sides in the short diameter direction D12 of the caulked part 53. There are two short diameter parts 53*b*, too. Two short diameter parts 53*b* configure the peripheral edge parts excluding the steps 53*d* of the peripheral edge parts at the both sides in the long diameter direction D11 of the caulked part 53.

In the present embodiment, a length L1 in the short diameter direction D12 of the long diameter part 53*a* is longer than a length L2 in the long diameter direction D11 of the short diameter part 53*b*. Here, the length L1 of the long diameter part 53*a* means a maximum length in the short diameter direction D12 of the long diameter part 53*a*. In addition, the length L2 of the short diameter part 53*b* means a maximum length in the long diameter direction D11 of the short diameter part 53*b*.

In the present embodiment, a rate of a thickness T11 (see FIG. 6) of the long diameter part 53*a* with respect to a thickness T12 (see FIG. 5) of the short diameter part 53*b* is 0.9 to 1.1, or preferably 0.95 to 1.05. Here, the thickness T11 of the long diameter part 53*a* means an average thickness of two long diameter parts 53*a*. The thickness T12 of the short diameter part 53*b* means an average thickness of two short diameter parts 53*b*. In the present embodiment, a rate of the thickness T12 of the short diameter part 53*b* with respect to the thickness T11 of the long diameter part 53*a* is also 0.9 to 1.1, or preferably 0.95 to 1.05. Incidentally, when the rate of the thickness T11 of the long diameter part 53*a* with respect to the thickness T12 of the short diameter part 53*b* is within a range of 0.9 to 1.1, the thickness T11 of the long diameter part 53*a* might be the same as the thickness T12 of the short diameter part 53*b*, or might be thinner or thicker than the thickness T12 of the short diameter part 53*b*.

Incidentally, in the present embodiment, after the first caulking step S13 to the third caulking step S15 of FIG. 7 are performed, the portion of the caulked part 53 on which the step 53*d* has been added at the third caulking step S15 is welded with the conductive member 55. Here, at the first caulking step S13 to the third caulking step S15, in a case where an oil is used when the terminal 50 is caulked, it is preferable to remove the oil with an air blow device or the like before the welding with the caulked part 53 and the conductive member 55.

From the above, in the present embodiment, as shown in FIG. 7, the manufacturing method for the secondary battery 10 includes the first preparation step S11, the second preparation step S12, the first caulking step S13, and the second caulking step S14. At the first preparation step S11, as shown in FIG. 8A, the terminal 50 including the shaft part 54 cylindrically formed in the oval like shape is inserted into the attachment hole 45 formed on the sealing plate 40 of the secondary battery 10, so as to make the shaft part 54 protrude from the sealing plate 40. At the second preparation step S12, the conductive member 55 is arranged on a surface at a side where the shaft part 54 of the sealing plate 40 protrudes at the periphery of the attachment hole 45. At the first caulking step S13, as shown in FIG. 8B, the first caulking tool 10, including the tip end part 101 formed in the oval like shape as shown in FIG. 9 and including the base end part 102 formed in the complete round shape whose diameter is larger than the tip end part 101, is used to insert the tip end part 101 into the shaft part 54 of the terminal 50, so as to make the base end part 102 expand the inner diameter of the portion protruding from the sealing plate 40 among the shaft part 54. At the second caulking step S14, as shown in FIG. 8C, the portion of the shaft part 54 expanded at the first caulking step S13 is pressed to be flat.

By doing this, as shown in FIG. 8B, it is possible with the tip end part 101 formed in the oval like shape of the first caulking tool 100 to uniformly abut the inner circumferential surface of the shaft part 54 formed in the oval like shape. Then, by making the base end part 102 formed in the complete round shape of the first caulking tool 100 abut the shaft part 54, it is possible to outwardly widen from a portion of the shaft part 54 along the long diameter direction D11 of the oval like shape, and thus it is possible to inhibit variation in the thicknesses of the caulked portion of the shaft part 54. Therefore, it is possible to secure the caulking strength of the terminal 50.

In the present embodiment, as shown in FIG. 4, the terminal 50 includes the caulked part 53 having been caulked in the oval like shape with respect to the conductive member 55. The caulked part 53 includes the long diameter part 53*a* along the long diameter direction D11 of the oval like shape, and the short diameter part 53*b* along the short diameter direction D12 of the oval like shape. The length L1 in the short diameter direction D12 of the long diameter part 53*a* is longer than the length L2 in the long diameter direction D11 of the short diameter part 53*b*. Here, at the first caulking step S13 of FIG. 7, as shown in FIG. 8B, by using the base end part 102 formed in the complete round shape of the first caulking tool 100, the shaft part 54 formed in the oval like shape of the terminal 50 is expanded. At that time, a portion to become the long diameter part 53*a* is outwardly widened at first, and then a portion to become the short diameter part 53*b* is outwardly widened. As the result, the length L1 of the long diameter part 53*a* becomes longer than the length L2 of the short diameter part 53*b*. Thus, by using the base end part 102 formed in the complete round shape to expand the shaft part 54 formed in the oval like shape, it is possible to make the length L1 of the long diameter part 53*a* be longer than the length L2 of the short diameter part 53*b*.

In the present embodiment, the rate of the thickness T11 (see FIG. 6) of the long diameter part 53*a* with respect to the thickness T12 (see FIG. 5) of the short diameter part 53*b* is 0.9 to 1.1. By doing this, it is possible to inhibit variation in the thicknesses of the caulked part 53, and thus it is possible to secure the caulking strength.

Anyway, the applicant of the present application performed tests in which, with below-described Example 1 and Example 2 of manufacturing methods for the secondary battery 10, the shaft part 54 of the terminal 50 was caulked and the rate (T11/T12) of the thickness T11 of the long diameter part 53*a* with respect to the thickness T12 of the short diameter part 53*b* was calculated.

Example 1

The first caulking tool 100 as shown in FIG. 8B and FIG. 9, in other words, the first caulking tool 100 whose tip end part 101 was formed in the oval like shape was used to caulk the terminal 50.

Example 2

The first caulking tool was used, in which the tip end part of the first caulking tool was formed in the complete round shape, to caulk the terminal 50.

Incidentally, not only in Example 1 but also in Example 2, the procedure of the first preparation step S11, the second preparation step S12, the second caulking step S14, and the third caulking step S15 is the same. Here, the manufacturing method for Example 1 was performed on 10 terminals 50, total 10 times. Then, for each of the plurality of terminals 50, the rate of the thickness T11 of the long diameter part 53*a* with respect to the thickness T12 of the short diameter part 53*b* was calculated. Similarly, the manufacturing method of Example 2 was performed on 10 terminals 50, total 10 times. Then, for each of the plurality of terminals 50, the rate of the thickness T11 of the long diameter part 53*a* with respect to the thickness T12 of the short diameter part 53*b* was calculated. These results are shown in FIG. 10.

Figure 10:
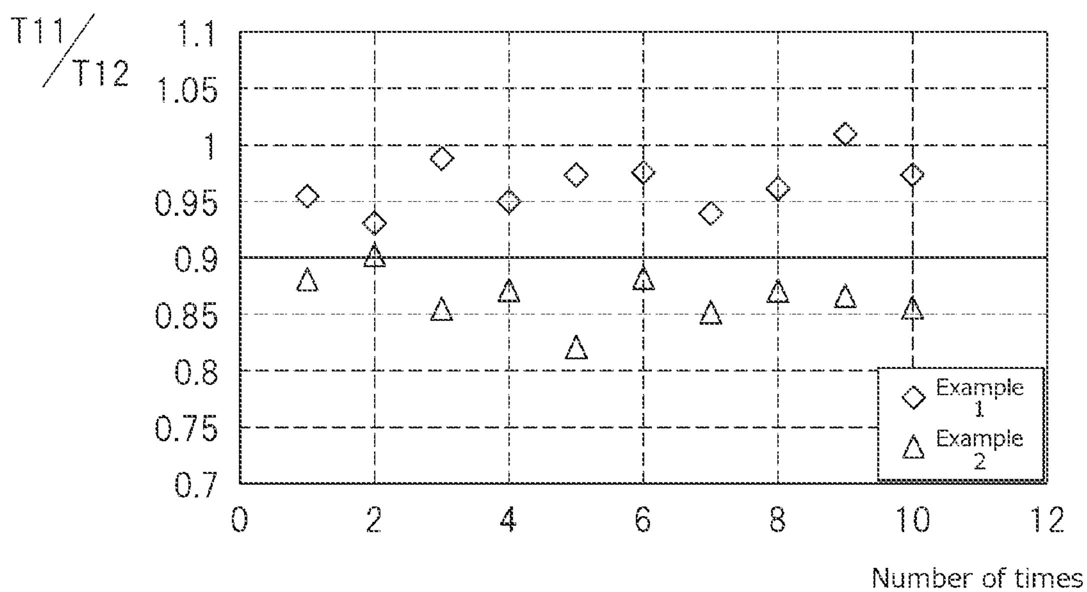
FIG. 10 is a graph that shows a result of a rate of a thickness of a long diameter part with respect to a thickness of a short diameter part of a caulked part.

While shown in FIG. 10, in a case where the first caulking tool 100 including the oval-like-shaped tip end part 101 was used like as Example 1 to caulk the terminal 50, the rate (T11/T12) was 0.9 to 1.1. An average of the rates (T11/T12) in Example 1 was 0.964. On the other hand, in the case where the first caulking tool including the complete-round-shaped tip end part was used like as Example 2 to caulk the terminal 50, the rate (T11/T12) was 0.8 to 0.9. An average of the rates (T11/T12) in Example 2 was 0.864. From these things, it can be understood that, by using the first caulking tool 100 including the oval-like-shaped tip end part 101, the value of the rate (T11/T12) can be closer to 1.0 and the variation in the thicknesses of the caulked part 53 of the terminal 50 can be inhibited.

In the present embodiment, as shown in FIG. 8B, the base end part 102 of the first caulking tool 100 includes the reduced diameter portion 103 whose diameter becomes smaller toward the tip end part 101. At the first caulking step S13 of FIG. 7, the reduced diameter portion 103 of the base end part 102 is used to expand the inner diameter of the portion of the shaft part 54 protruding from the sealing plate 40. By doing this, the portion of the shaft part 54 protruding from the sealing plate 40 has the inner diameter being gradually expanded, depending on the diameter of the reduced diameter portion 103. Thus, it is easy to expand the portion of the shaft part 54 protruding from the sealing plate 40.

In the present embodiment, the manufacturing method for the secondary battery 10 includes, as shown in FIG. 8D, the third caulking step S15 (see FIG. 7) for pressing the peripheral edge part in the long diameter direction D11 of the oval like shape, of the expanded portion of the shaft part 54 pressed to be flat at the second caulking step S14 of FIG. 7, so as to form the step 53*d*. By doing this, the portion provided with the step 53*d* becomes in a pressed state, and thus it is possible to hardly form a gap between the portion of the shaft part 54 provided with the step 53*d* and the conductive member 55. Therefore, it is possible to properly perform welding at the portion provided with the step 53*d* by welding with the conductive member 55.

In the present embodiment, the electrode body 20 was a laminate type of the electrode body on which the positive electrode sheet 21, the negative electrode sheet 22, and the separator 23 are laminated. However, the electrode body 20 might be a wound type of the electrode body on which the positive electrode sheet 21, the negative electrode sheet 22, and the separator 23 are wound in a state of being superimposed.

What is claimed is:

1. A manufacturing method for a secondary battery, comprising:

- a first preparation step for inserting a terminal formed in an oval like shape and having a cylindrical shaft part into an attachment hole formed on a sealing plate of a secondary battery that comprises a case main body whose part is opened and comprises the sealing plate provided at the opening of the case main body, so as to make the shaft part protrude from the sealing plate;
- a second preparation step for arranging a conductive member at a periphery of the attachment hole and on a surface at a side where the shaft part of the sealing plate protrudes;
- a first caulking step for using a caulking tool having a tip end part formed in an oval like shape and having a base end part formed in a complete round shape whose diameter is larger than the tip end part, to insert the tip end part into the shaft part of the terminal, so as to make the base end part expand an inner diameter of a portion of the shaft part protruding from the sealing plate; and
- a second caulking step for pressing the portion of the shaft part expanded at the first caulking step to be flat.

2. The manufacturing method for the secondary battery according to claim 1, wherein the base end part comprises a reduced diameter portion whose diameter becomes smaller toward the tip end part, and at the first caulking step, the reduced diameter portion of the base end part is used to expand the inner diameter of the portion of the shaft part protruding from the sealing plate.

3. The manufacturing method for the secondary battery according to claim 1, further comprising a third caulking step for pressing to form a step on a peripheral edge part in a long diameter direction of the oval like shape of the expanded portion of the shaft part pressed to be flat at the second caulking step.

* * * * *